United States Patent
Zemany et al.

(10) Patent No.: US 12,044,506 B1
(45) Date of Patent: Jul. 23, 2024

(54) OFF-AXIS PROJECTILE GUIDANCE

(71) Applicant: BAE Systems Information and Electronic Systems Integration Inc., Nashua, NH (US)

(72) Inventors: Paul D. Zemany, Amherst, NH (US); Matthew F. Chrobak, Groton, MA (US); Court E. Rossman, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 473 days.

(21) Appl. No.: 17/347,976

(22) Filed: Jun. 15, 2021

(51) Int. Cl.
*F41G 7/22* (2006.01)

(52) U.S. Cl.
CPC ......... *F41G 7/2246* (2013.01); *F41G 7/2286* (2013.01)

(58) Field of Classification Search
CPC ...... F41G 7/2246; F41G 7/2286; G05D 1/107
See application file for complete search history.

(56) References Cited

U.S. PATENT DOCUMENTS

| | | | | |
|---|---|---|---|---|
| 5,050,818 A * | 9/1991 | Sundermeyer | ........ | F41G 7/2293 244/3.15 |
| 5,328,129 A * | 7/1994 | Gray | ......... | F41G 7/22 244/3.15 |
| 6,666,410 B2 * | 12/2003 | Boelitz | ........ | F42B 15/01 244/171.1 |
| 8,063,347 B1 * | 11/2011 | Urbano | ........ | F41G 7/30 342/61 |
| 2007/0295855 A1 * | 12/2007 | Lam | ........ | F41G 7/2286 244/3.1 |
| 2010/0314487 A1 * | 12/2010 | Boelitz | ........ | G05D 1/105 701/13 |

FOREIGN PATENT DOCUMENTS

| | | | | |
|---|---|---|---|---|
| CN | 106843272 A | * | 6/2017 | ........ G05D 1/107 |
| WO | WO02/48636 A1 | * | 6/2002 | ........ G05D 1/107 |
| WO | WO2018/111282 A1 | * | 6/2018 | ........ F41G 7/2246 |

* cited by examiner

*Primary Examiner* — Bernarr E Gregory
(74) *Attorney, Agent, or Firm* — Gary McFaline (57) ABSTRACT

Techniques are provided for off-axis projectile guidance. A methodology implementing the techniques according to an embodiment includes determining a maximum acceleration capability of the projectile based on flight data, control surface positions, and aerodynamic coefficients. The method also includes estimating a range from the projectile to a target. The method further includes calculating a first flight path to provide an offset radar viewing angle to the target that is offset from a longitudinal axis of the projectile and calculating a second flight path to provide for interception of the target by the projectile. The calculations are based on the maximum acceleration capability and the range from the projectile to the target. The method further includes guiding the projectile on the first flight path for an initial period of time and then guiding the projectile on the second flight path until target interception.

20 Claims, 8 Drawing Sheets

OFF-AXIS PROJECTILE GUIDANCE

FIELD OF DISCLOSURE

The present disclosure relates to projectile guidance, and more particularly, to off-axis projectile guidance.

BACKGROUND

Traditional missile guidance techniques generally aim the missile or projectile along a flight path that is pointed directly towards the intended target. In such cases, a direction finding (DF) system (such as a radar based system) is employed on the projectile to enable it to track the target until engagement and destruction is achieved. DF performance, particularly angular resolution, is degraded by this direct-to-target flight path since cross range data (e.g., target motion perpendicular to the flight path of the projectile) is limited by the relatively small aperture size of a nose mounted antenna. Additionally, in some cases, design constraints might not allow installation of an antenna on the missile nose. In such cases, the antennas or other sensors of the DF system are located on the side of the projectile, rather than in the nose of the projectile, causing the radar field of view to the target to be sub-optimal, resulting in further degradation under the direct-to-target flight path.

Although the following Detailed Description will proceed with reference being made to illustrative embodiments, many alternatives, modifications, and variations thereof will be apparent to those skilled in the art.

DETAILED DESCRIPTION

Techniques are provided for off-axis projectile guidance. The techniques can be used to provide high radar resolution and range accuracy, relative to existing solutions, according to some embodiments. As noted previously, existing missile guidance techniques (sometimes referred to as proportional navigation) aim the projectile on a flight path that is directed towards the target. Such a flight path is sub-optimal for the DF performance of the radar system of the projectile, particularly for side mounted radars. To this end, and in accordance with an embodiment of the present disclosure, an off-axis projectile guidance system is disclosed which provides for an initial off-axis flight path that improves radar performance and resolution relative to proportional navigation guidance systems, and a subsequent flight path that steers the projectile to impact the intended target. The flight paths are calculated based on aerodynamic and maneuverability characteristics of the projectile. The initial off-axis flight path allows the radar system to realize the benefit of improved resolution that is available with the larger aperture of a side mounted radar, for example to better separate close targets.

The disclosed techniques can be implemented, for example, in a computing system or a software product executable or otherwise controllable by such systems, although other embodiments will be apparent (e.g., gate-level logic). In accordance with an embodiment, a methodology to implement these techniques includes determining a maximum acceleration capability of the projectile based on flight data, control surface positions, and aerodynamic coefficients. The method also includes estimating a range from the projectile to a target. The method further includes calculating a first flight path to provide an offset radar viewing angle to the target that is offset from a longitudinal axis of the projectile to improve angular resolution and range accuracy. The method further includes calculating a second flight path to provide for interception of the target by the projectile. The calculations are based on the maximum acceleration capability and the range from the projectile to the target. The method further includes guiding the projectile on the first flight path for an initial period of time and then maneuvering the projectile onto the second flight path for the remaining flight time.

It will be appreciated that the guidance techniques described herein may provide improved radar DF capabilities, including relatively high angular resolution and range accuracy, compared to existing guidance techniques that aim the projectile directly towards the target (which can be thought of as on-axis techniques, as will be appreciated in light of this disclosure). The techniques disclosed herein may further be implemented in hardware or software or a combination thereof. Numerous embodiments and applications will be apparent in light of this disclosure.

Figure 1:
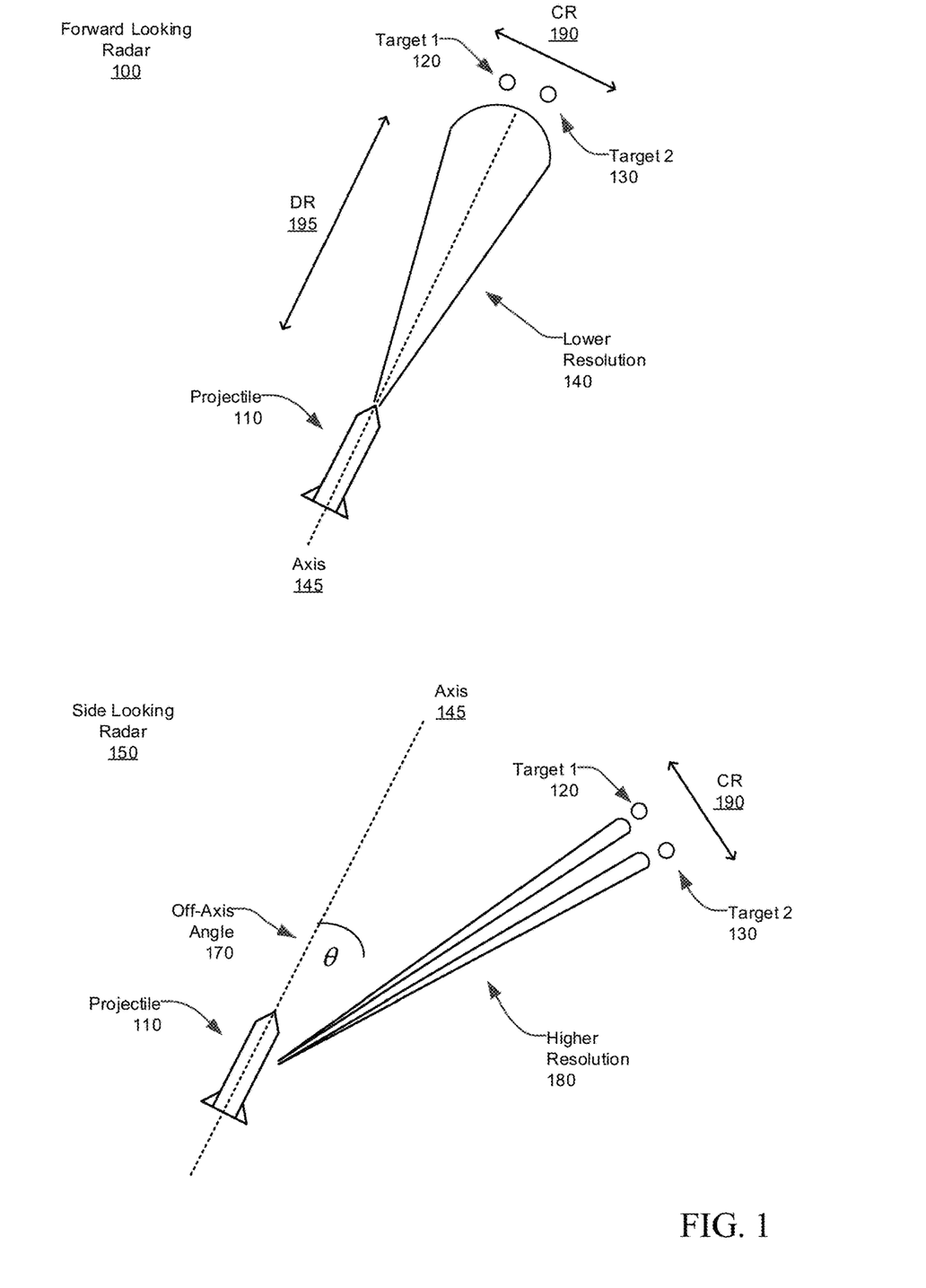
FIG. 1 illustrates an example forward looking radar scenario and an example side looking radar scenario, in accordance with an embodiment of the present disclosure.

FIG. 1 illustrates an example forward looking radar scenario 100 and an example side looking radar scenario 150, in accordance with an embodiment of the present disclosure. In the forward looking radar scenario 100, the radar antennas or sensors are looking in the forward direction, along the longitudinal axis 145 of the projectile 110, towards the target or targets 120, 130. Down range (DR) 195 is shown as the distance along the direction from the projectile to the target. In this scenario, DR is parallel to the axis 145. Cross range (CR) 190, or angular separation, is shown as a dimension that is perpendicular to the radar viewing direction (the axis 145). The angular resolution of the radar is limited to the inherent beamwidth of the radar 140 which may be too wide to resolve two closely spaced targets 120 and 130.

In the side looking radar scenario 150, however, the projectile is moving along the longitudinal axis 145 which is not directed towards the target. As such, the radar antennas are looking at the target along an off-axis angle θ 170 (also referred to herein as an offset radar viewing angle). As the projectile moves forward along the axis, this viewing angle 170 to the target changes, which is to say that the target is seen from different angles as the projectile moves. This varying angle provides a larger effective radar aperture (e.g., similar to the operation of a synthetic aperture radar) which improves the angular resolution. The resulting higher angular resolution 180 may therefore allow for the separation of two closely spaced targets 120 and 130.

Some radar systems use Doppler frequency shift to separate targets in range and cross range. Another advantage of the side looking radar scenario 150 is that it provides greater Doppler shift for use by the radar. In some embodiments, Doppler frequency shift fa can be expressed as:

$$f_d = \frac{2}{\lambda}|v|\cos(\theta) \quad (1)$$

where $\lambda$ is the wavelength of the radar, v is the velocity of the projectile relative to the target, and $\theta$ is the off-axis angle 170. Because the cosine function is relatively flat in the neighborhood of zero degrees and then progresses through a more rapid rate of change as the angle approaches ninety degrees, a larger off-axis angle provides a steeper Doppler gradient versus angle. This steeper gradient versus angle provides a larger delta Doppler frequency between closely spaced targets and thus enables the radar system to achieve greater target separation with changing $\theta$ as the projectile flies along the off-axis flight path. The off-axis guidance scheme provides a more favorable geometry for target resolution. Range accuracy may also improve because snapshots taken over time, at different bearing angles to the target, can be fed to a tracker (e.g., a Kalman filter tracker) which provides better range estimates than a single pulse time of flight measurement. Additionally, target direction can be estimated by measuring range to the target at multiple positions along a path that is not aimed directly at the target.

Yet another advantage of the side looking radar scenario 150 is obtained if the antennas are located on the side of the projectile, rather than in the nose of the projectile. In such case, the radar resolution and field of view to the target will be improved in the side looking scenario since the antennas are located on the side of the projectile and the length of the missile body permits a larger antenna baseline than is possible with a nose mounted array.

Figure 2:
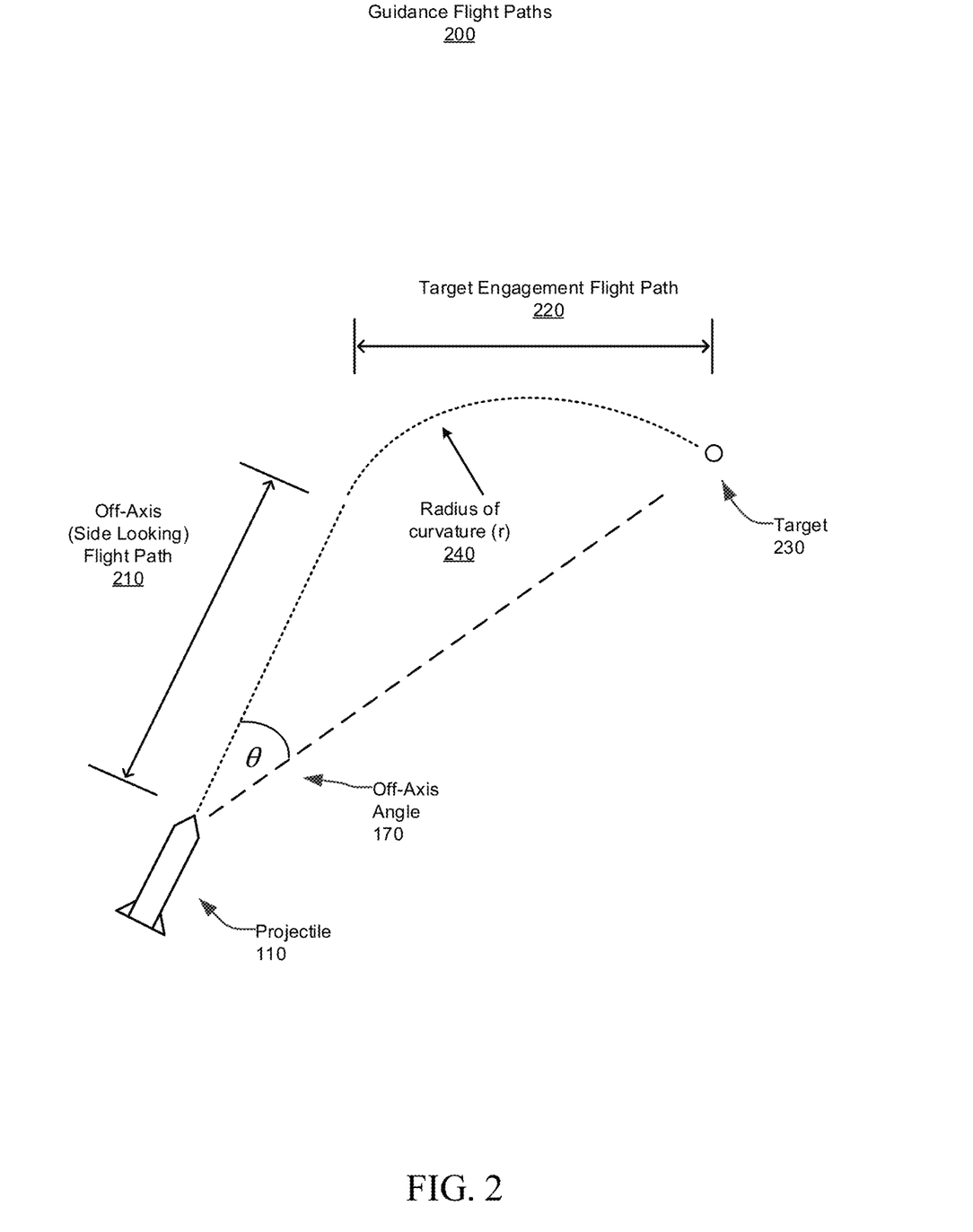
FIG. 2 illustrates example guidance flight paths, in accordance with an embodiment of the present disclosure.
Figure 3:
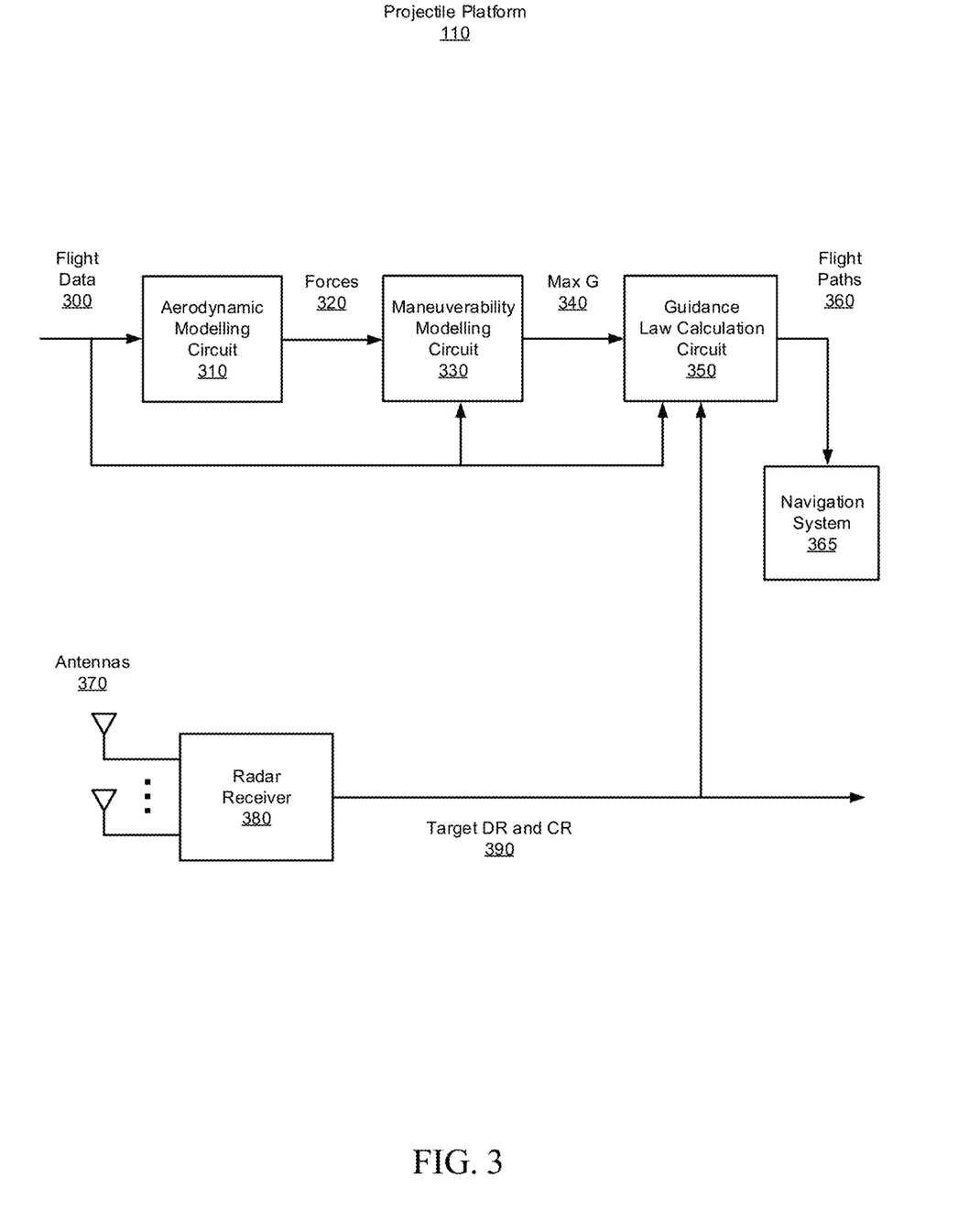
FIG. 3 is a block diagram of a projectile platform, configured in accordance with an embodiment of the present disclosure.

FIG. 2 illustrates example guidance flight paths 200, in accordance with an embodiment of the present disclosure. The first flight path 210 provides an off-axis side looking radar view which offers improved radar resolution and range accuracy as described above. Ultimately, though, the projectile 110 needs to engage the target 230. The second flight path 220 provides for maneuvering of the projectile towards the target for engagement and destruction. A relatively long off-axis flight path 210 followed by a short target engagement flight path 220 is desirable to maximize the amount of time during which the radar DF capabilities are enhanced. However, the maneuvering capabilities of the projectile, specifically the maximum G forces that it can generate and withstand, place a lower limit on the length of the target engagement flight path. A long off-axis flight path 210 followed by a short target engagement flight path 220 results in a tighter turning radius (radius of curvature r) 240. This requires greater maneuverability, in the form of angular acceleration and associated G forces, to steer into the target. The systems and techniques described below, in connection with FIG. 3, provide a guidance law (e.g., calculated flight paths) that balance the lengths of the off-axis flight path 210 and the subsequent target engagement flight path 220 based on the projectile aerodynamic capabilities. In some embodiments, the point at which the flight paths are switched is based on the measured distance to the target (which can be obtained, for example, from the radar). For example, when the distance to the target falls below a certain value, the required maneuverability to steer into the target will exceed the capabilities of the projectile, and thus, the flight paths should be switched before that occurs.

FIG. 3 is a block diagram the projectile platform 110, configured in accordance with an embodiment of the present disclosure. The projectile platform 110 is shown to include an aerodynamic modelling circuit 310, a maneuverability modelling circuit 330, a guidance law calculation circuit 350, a navigation system 365, a radar receiver 380, and antennas 370.

The radar receiver 380 is configured to estimate a range (DR) from the projectile to a target. Any suitable range estimation technique may be used, in light if the present disclosure, including round trip timing of radar pulses transmitted and received through antennas 370 (e.g., time of flight measurements). In some embodiments, the antennas 370 are mounted on the side of the projectile.

In some embodiments, the radar receiver 380 may include a radar transmitter (e.g., to transmit the pulses). In other embodiments, a separate radar transmitter may be employed for that purpose. In some such embodiments, the radar transmitter may be located external to the projectile, for example where design constraints related to power and weight make it impractical to include the radar transmitter on the projectile, or where it may otherwise be desirable to operate the transmitter at a different location (e.g., on an aircraft or at a ground station).

The aerodynamic modelling circuit 310 is configured to calculate aerodynamic forces and moments 320 on the projectile. The calculation is based, at least in part, on projectile flight data 300 and on aerodynamic properties (also referred to as aerodynamic coefficients) of the projectile. Operation of the aerodynamic modelling circuit 310 is described in greater detail below in connection with FIG. 4.

The maneuverability modelling circuit 330 is configured to determine a maximum acceleration capability (max G) 340 of the projectile. In some embodiments, the maneuverability modelling circuit calculates linear and angular (e.g., rotational) acceleration of the projectile, based on the aerodynamic forces and moments 320, and determines the maximum acceleration capability of the projectile based on those calculations. Operation of the maneuverability modelling circuit 330 is described in greater detail below in connection with FIG. 5.

The guidance law calculation circuit 350 is configured to calculate the first and second flight paths 360 of the projectile. The first flight path is calculated to provide an offset radar viewing angle from the projectile to the target. The offset is the angular offset of the viewing angle from the longitudinal axis of the projectile. The second flight path is calculated to provide for interception of the target by the projectile. The calculations are based, at least in part, on the maximum acceleration capability 340 of the projectile and the range from the projectile to the target (DR) 390, since greater acceleration is needed to shift from the first flight path to the second flight path as the projectile gets closer to the target. Operation of the guidance law calculation circuit 350 is described in greater detail below in connection with FIG. 6.

The navigation system 365 (or autopilot) is configured to guide the projectile on the first flight path for an initial period of time and then maneuver the projectile onto the second flight path for the remaining flight time, thus providing improved radar angular resolution and range accuracy for the target during the first flight path and then providing interception of the target during the second flight path.

Figure 4:
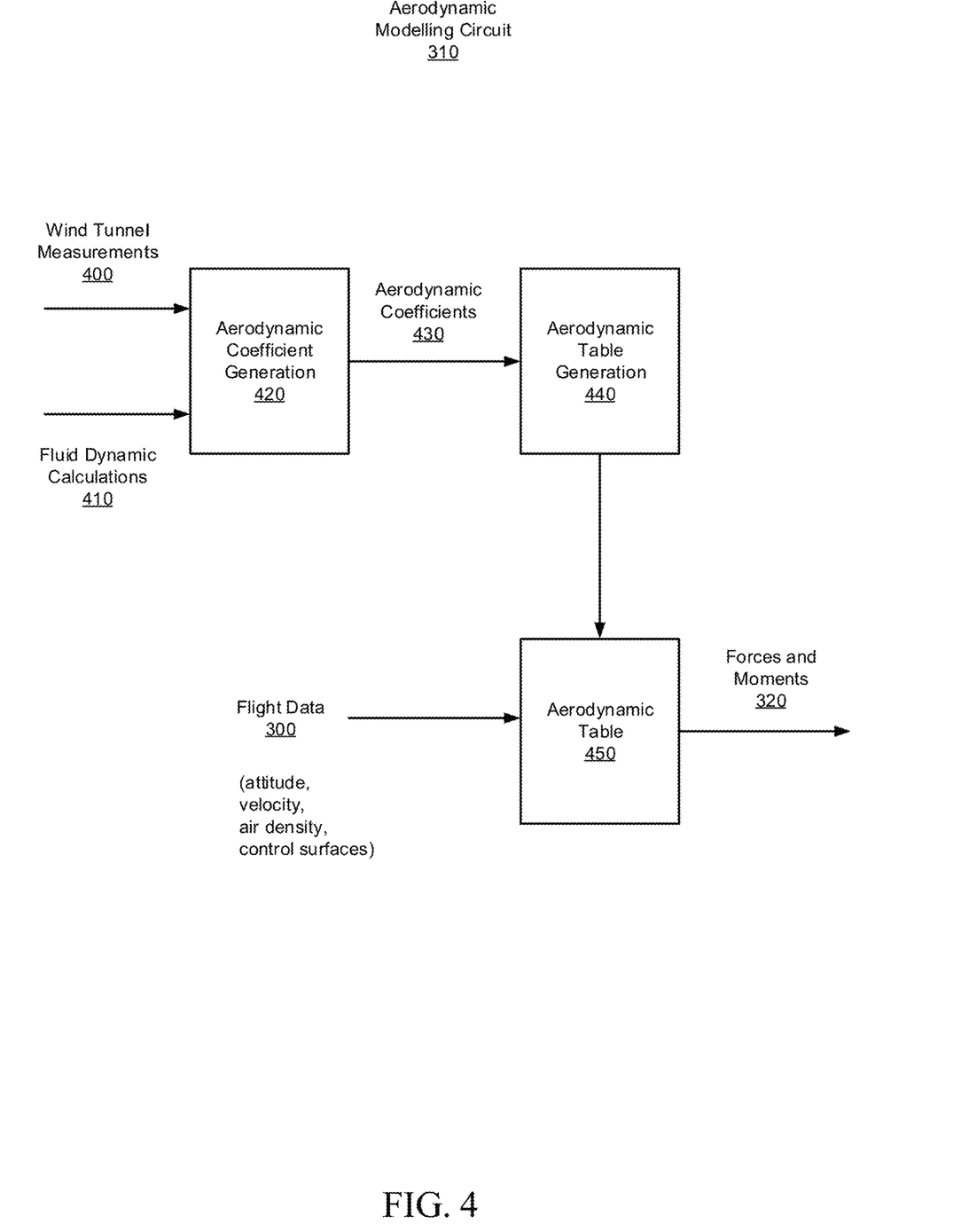
FIG. 4 is a block diagram of the aerodynamic modelling circuit of FIG. 3, configured in accordance with an embodiment of the present disclosure.

FIG. 4 is a block diagram of the aerodynamic modelling circuit 310, configured in accordance with an embodiment of the present disclosure. The aerodynamic modelling circuit 310 is configured to calculate aerodynamic forces and moments 320 on the projectile and is shown to include an aerodynamic coefficient generation process 420 and an aerodynamic table generation circuit 440.

The aerodynamic coefficient generation process 420 is configured to generate aerodynamic coefficients 430 which describe or define the aerodynamic properties of the projectile. In some embodiments, the aerodynamic coefficients are generated from wind tunnel measurements 400 of the projectile (or a mockup of projectile). In some embodiments, aerodynamic coefficients may be calculated from equations of computational fluid dynamics 410 which are applied to parameters of the projectile. These parameters may include, at least in part, the 3-dimensional shape of the projectile, the mass of the projectile, and the inertia moment of the projectile, which are physical properties that can be obtained as specifications of the projectile design or through physical measurements of the projectile.

The aerodynamic table generation circuit 440 is configured to generate an aerodynamic table 450 that can be employed to provide forces and moments 320 on the projectile for any given conditions (e.g., flight data 300). In some embodiments, flight data 300 may include, for example, one or more of projectile attitude, projectile velocity, air density, and control surface positions of the projectile. In some embodiments, the table 450 is indexed by input parameters comprising the flight data elements. For a given index, the table provides outputs that include the forces and moments 320 on the projectile that correspond to those inputs. It will be appreciated that in some embodiments, alternatives techniques may be used to generate the forces and moments 320, based on the aerodynamic coefficients 430 and flight data 300. For example, a system of equations or models of varying complexity may be employed in place of the table 450.

Figure 5:
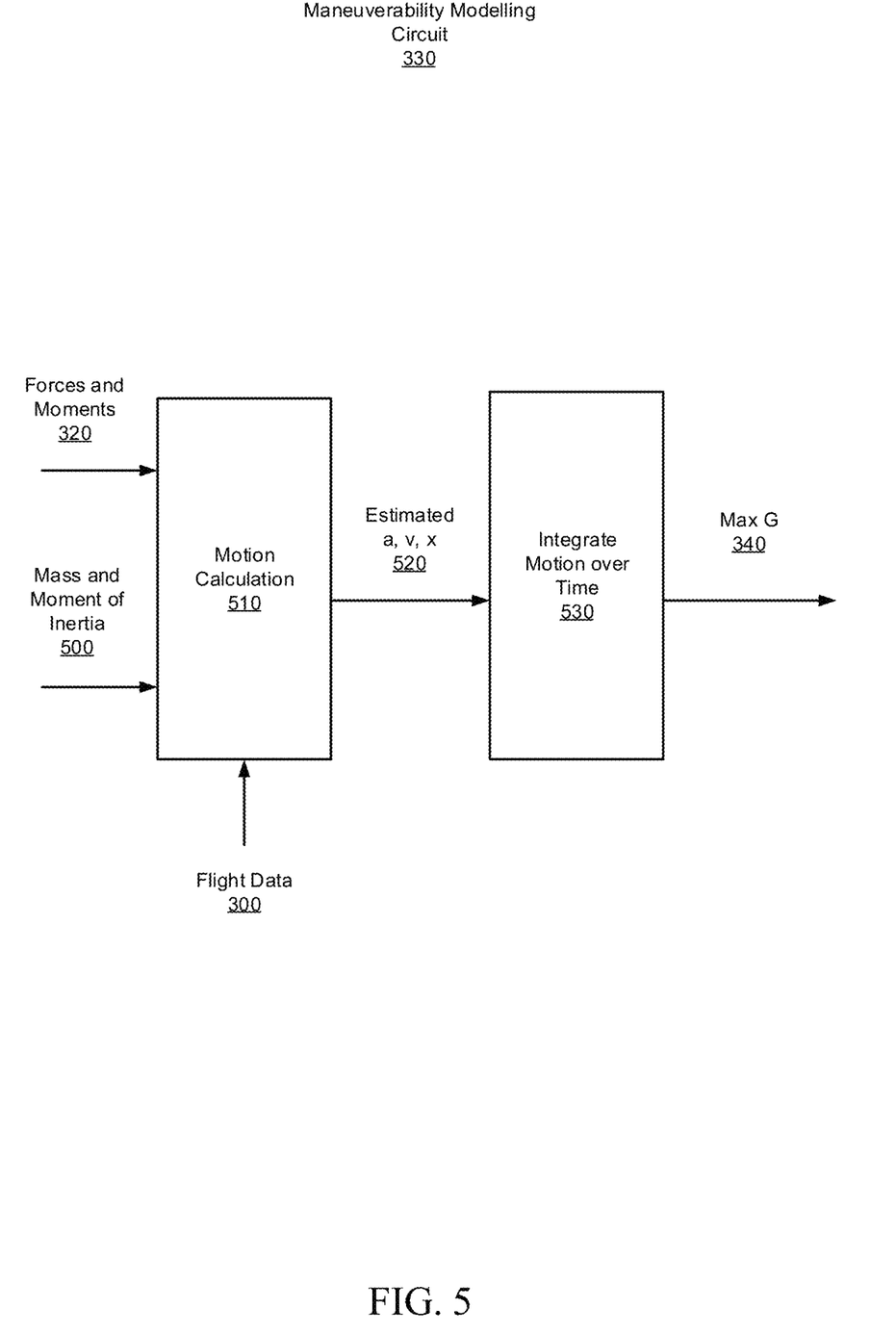
FIG. 5 is a block diagram of the maneuverability modelling circuit of FIG. 3, configured in accordance with an embodiment of the present disclosure.

FIG. 5 is a block diagram of the maneuverability modelling circuit 330, configured in accordance with an embodiment of the present disclosure. The maneuverability modelling circuit 330 is configured to determine a maximum acceleration capability (max G) 340 of the projectile based on current flight data, the forces and moments 320 provided by the aerodynamic table 430, and the mass and moment of inertia of the projectile. The maneuverability modelling circuit 330 is shown to include a motion calculation circuit 510 and a motion integration circuit 530.

The motion calculation circuit 510 is configured to employ equations of motion to calculate the linear and angular acceleration of the projectile. Flight data 300, including, for example, current projectile attitude, projectile velocity, air density, and control surface positions, is used to index into the aerodynamic table 450 to retrieve forces and moments corresponding to the flight data. Linear and angular acceleration can then be estimated using those forces and moments, combined with the mass and moment of inertia of the projectile (which are known quantities), by employing equations of motion (e.g., acceleration=force/mass, etc.). Velocity and position can also be estimated from the equations of motion. In some embodiments, the estimated acceleration, velocity, and position 520 may be supplied to a motion integration circuit 530 which is configured to integrate the projectile motion over time to predict future values of acceleration, velocity, and position 520. Current and/or future values of acceleration may be used as an estimate of the maximum G force available 340 to execute a maneuver from a first (off-axis) flight path 210 to a second (target engagement) flight path 220.

In some embodiments, the maneuverability modelling circuit 330 may be implemented as a look up table, for example a table that maps input values of flight data, forces/moments, and mass/moment of inertia to an output values of linear and angular acceleration. In some embodiments, the modelling may be more complex and may be based on a 3-degrees-of freedom (3-DOF) model, or a 6-degrees-of-freedom (6-DOF) model, which may also be linear or non-linear models.

Figure 6:
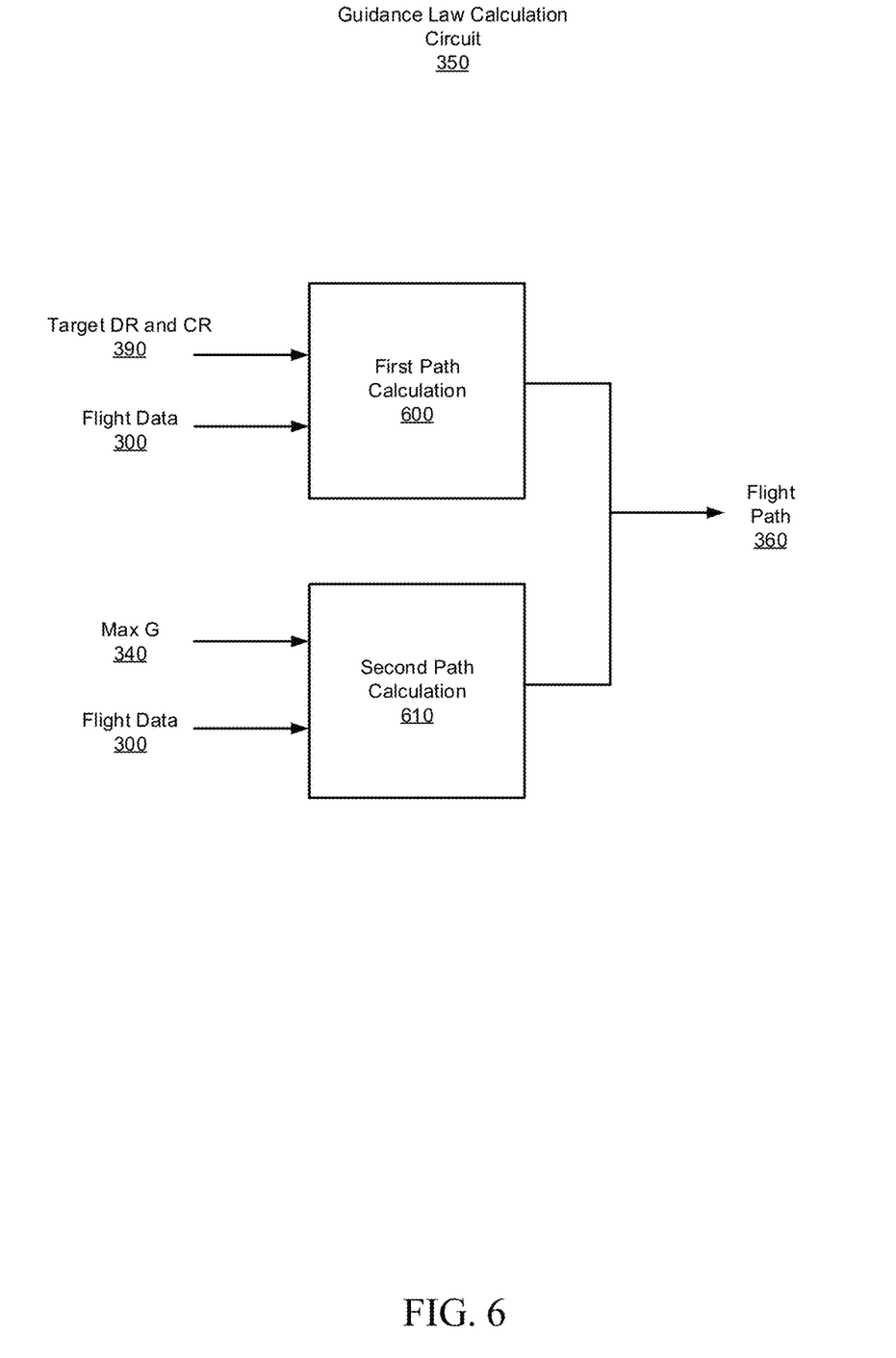
FIG. 6 is a block diagram of the guidance law calculation circuit of FIG. 3, configured in accordance with an embodiment of the present disclosure.

FIG. 6 is a block diagram of the guidance law calculation circuit 350, configured in accordance with an embodiment of the present disclosure. The guidance law calculation circuit 350 is shown to include a first path calculation circuit 600 and a second path calculation circuit 610.

The first path calculation circuit 600 is configured to calculate the first flight path 210 of the projectile to provide an offset radar viewing angle from the projectile to the target. The offset is the angular offset of the viewing angle from the longitudinal axis of the projectile. In some embodiments, the offset radar viewing angle θ is related to the maximum acceleration capability 340 of the projectile, designated (a) below, and the range to the target (DR), according to equation (2) below. The maximum acceleration is provided by the maneuverability modelling circuit 330, and the range is provided by the radar receiver 380.

$$CR = \frac{1}{2}at^2 \qquad (2)$$
$$t = \frac{DR}{v}$$
$$CR = \frac{1}{2}a\left(\frac{DR}{v}\right)^2$$
$$\theta \sim \frac{CR}{DR} = \frac{1}{2}a\frac{DR}{v^2}$$

where t is the time remaining until interception with the target assuming the projectile is traveling at a velocity v.

In some embodiments, the offset radar viewing angle is based on radar DF angular resolution and range accuracy requirements. For example, there may be an operational requirement to resolve two targets that are separated by N meters, at a distance of M, meters from the projectile, which translates into an angular resolution requirement of approximately arctan(NM). The angular resolution requirement relates back to offset radar viewing angle and Doppler frequency shift as previously expressed in equation (1), where increased Doppler frequency shift provides greater angular resolution. In some embodiments, the offset radar viewing angle is in the range of four to six degrees.

The second path calculation circuit 610 is configured to calculate the second flight path 220 to provide for interception of the target by the projectile. The calculations are based, at least in part, on the maximum acceleration capability 340 of the projectile and the range from the projectile to the target, since greater acceleration is needed to steer from the first flight path to the second flight path as the projectile gets closer to the target, which results in a tighter turning radius (r) 240 and a greater acceleration ($v^2/r$).

In some embodiments, the predict future values of acceleration, velocity, and position, as provided by motion integration circuit 530 may be used to estimate the time and position when a switch to the second flight path 220 will be needed based on the maximum G forces that will be available to execute the maneuver.

Methodology

Figure 7:
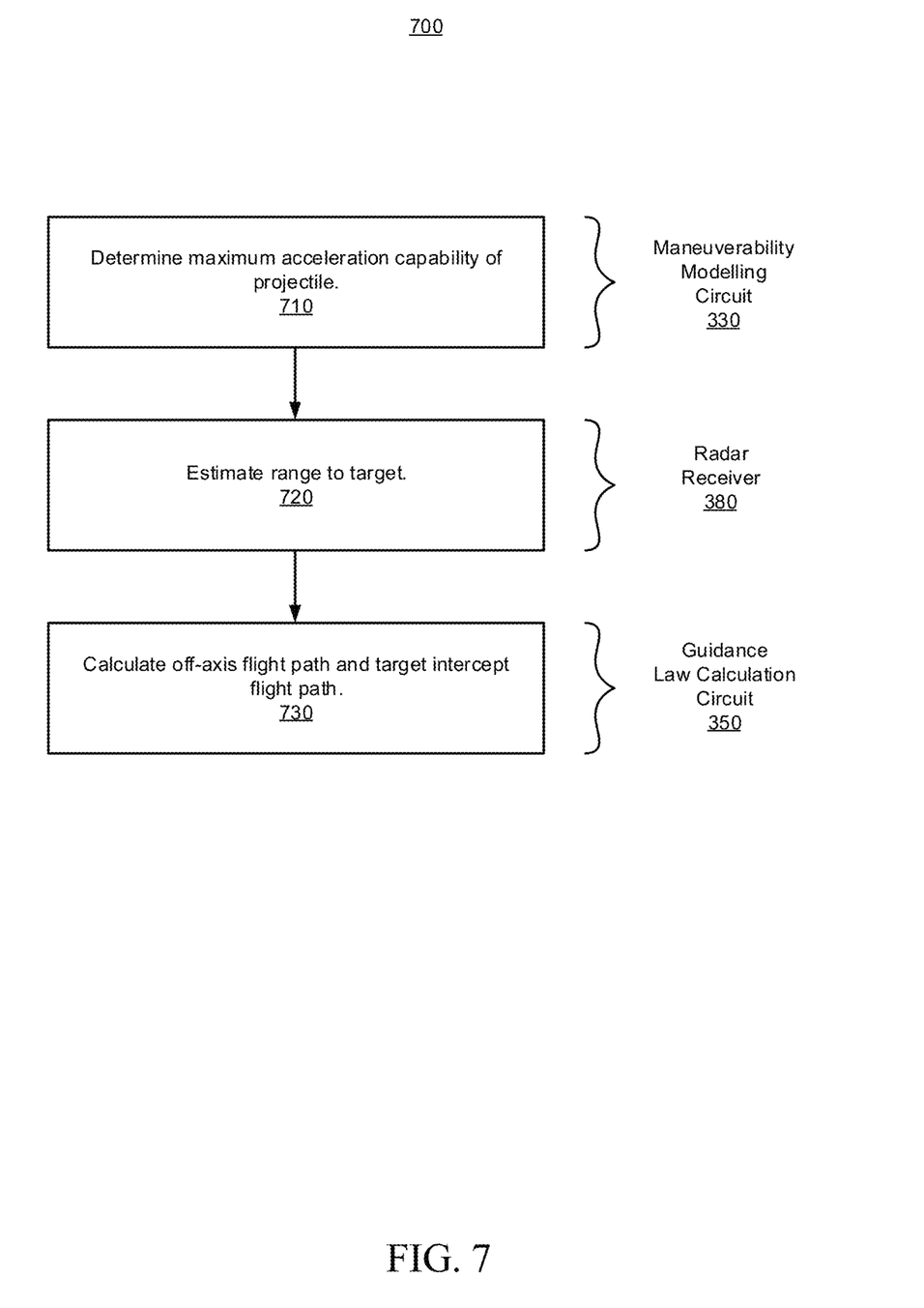
FIG. 7 is a flowchart illustrating a methodology for off-axis projectile guidance, in accordance with an embodiment of the present disclosure.

FIG. 7 is a flowchart illustrating a methodology 700 for off-axis projectile guidance, in accordance with an embodiment of the present disclosure. As can be seen, example method 700 includes a number of phases and sub-processes, the sequence of which may vary from one embodiment to another. However, when considered in the aggregate, these phases and sub-processes form a process for off-axis projectile guidance, in accordance with certain of the embodiments disclosed herein. These embodiments can be implemented, for example using the system architecture illustrated in FIGS. 3-6, as described above. However other system architectures can be used in other embodiments, as will be apparent in light of this disclosure. To this end, the correlation of the various functions shown in FIG. 7 to the specific components illustrated in FIGS. 3-6, is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 7, in one embodiment method 700 commences, at operation 710, by determining a maximum acceleration capability of the projectile.

Next, at operation 720, a range from the projectile to a target is estimated by a radar receiver, for example through round trip timing of reflected radar pulses.

At operation 730, a first and second flight path of the projectile are calculated. The first flight path is calculated to provide an offset radar viewing angle from the projectile to the target. The offset is the angular offset of the viewing angle from the longitudinal axis of the projectile. The second flight path is calculated to provide for interception of the target by the projectile. The calculations are based on the maximum acceleration capability of the projectile and the range from the projectile to the target. The projectile may then be guided on the first flight path for an initial period of time and on the second flight path for the remaining time until target interception, providing improved radar angular resolution and range accuracy for the target during the first flight path and interception of the target during the second flight path.

Of course, in some embodiments, additional operations may be performed, as previously described in connection with the system. These additional operations may include, for example, calculating aerodynamic forces and moments on the projectile based on aerodynamic coefficients of the projectile and on flight data. The flight data may include one or more of projectile velocity, projectile attitude, projectile altitude, and control surface positions of the projectile.

In some embodiments, linear and angular acceleration of the projectile are calculated, based on the aerodynamic forces and moments, and the maximum acceleration capability of the projectile is determined based on the calculated accelerations.

Example Platforms

Figure 8:
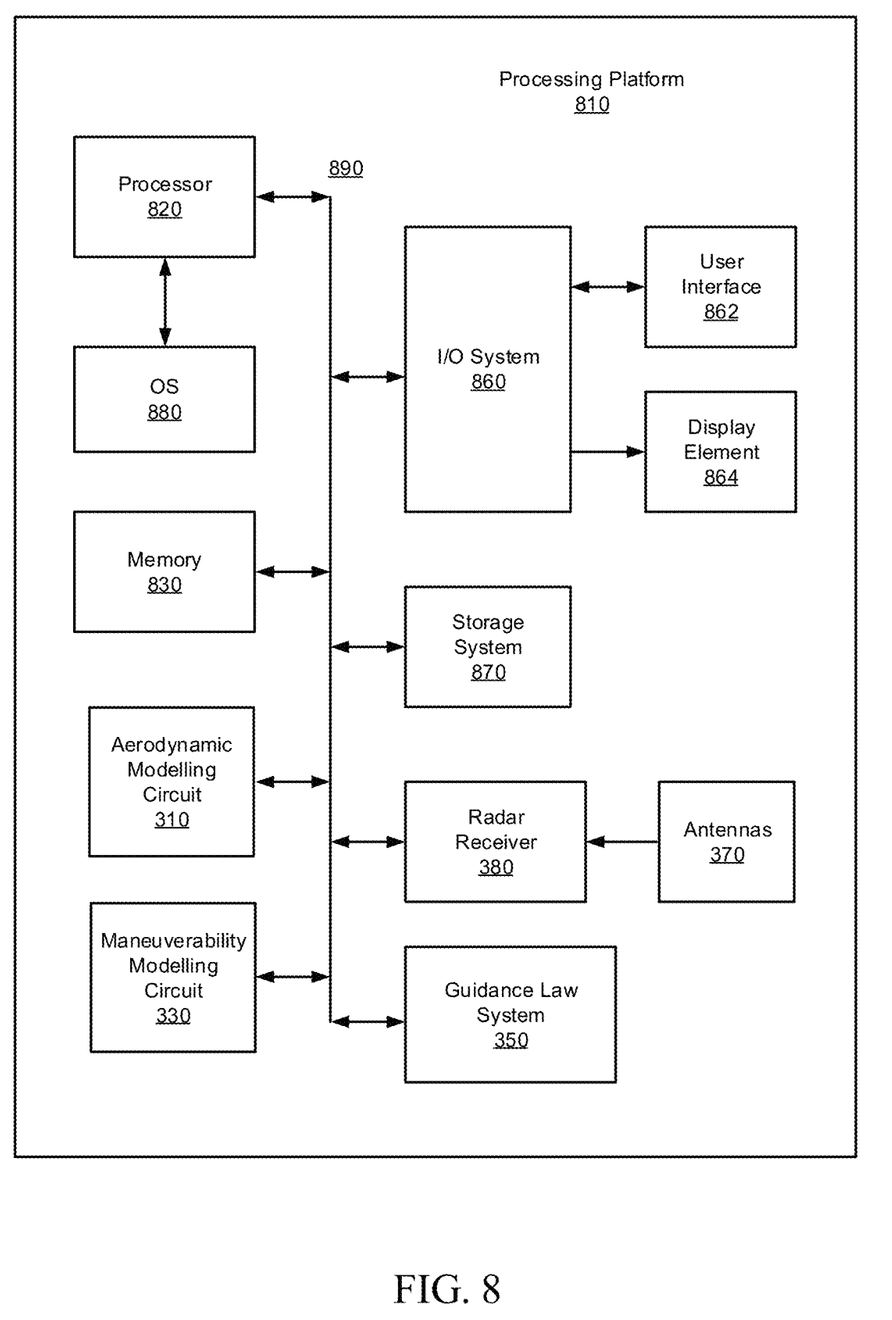
FIG. 8 is a block diagram schematically illustrating a processing platform employing the disclosed off-axis projectile guidance system, in accordance with certain embodiments of the present disclosure.

FIG. 8 is a block diagram schematically illustrating a processing platform 810 employing the disclosed off-axis projectile guidance system, in accordance with certain embodiments of the present disclosure. In some embodiments, processing platform 810, or portions thereof, may be hosted on, or otherwise be incorporated into a projectile or missile, the electronic systems of the projectile, or any other suitable platform.

In some embodiments, processing platform 810 may comprise any combination of a processor 820, a memory 830, an input/output (I/O) system 860, a user interface 862, a display element 864, a storage system 870, models 310 and 330, radar receiver 380, antennas 370, and guidance law system 350. As can be further seen, a bus and/or interconnect 890 is also provided to allow for communication between the various components listed above and/or other components not shown. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 810. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 820 may be configured to execute an Operating System (OS) 880 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 810, and therefore may also be implemented using any suitable existing or subsequently-developed platform.

I/O system 860 may be configured to interface between various I/O devices and other components of platform 810. I/O devices may include, but not be limited to, user interface 862 and display element 864, which may be utilized for configuration and testing of the system, for example. User interface 862 may include other devices (not shown) such as a touchpad, keyboard, mouse, microphone and speaker, trackball or scratch pad, and camera. I/O system 860 may include a graphics subsystem configured to perform processing of images for rendering on the display element 864. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 810.

It will be appreciated that in some embodiments, some of the various components of platform 810 may be combined or integrated in a system-on-a-chip (SoC) architecture. In some embodiments, the components may be hardware components, firmware components, software components or any suitable combination of hardware, firmware or software.

Guidance law system 350 is configured to calculate flight paths to provide an offset radar viewing angle to the target and to provide for interception of the target by the projectile, as described previously. Guidance law system 350 may employ data provided by models 310 and 330, as well as target information provided by radar receiver 380, as previously described. In one example, the offset radar viewing angle flight path provides improved range and resolution of targets, while the interception flight path allows for destruction of the target.

Various embodiments of platform 810 may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductors), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments platform 810 may comprise additional, fewer, or alternative subcomponents as compared to those included in the example embodiment of FIG. 8.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic)

within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable device. In any such hardware cases that include executable software, the terms "circuit" or "circuitry" are intended to include a combination of software and hardware such as a programmable device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a projectile guidance system comprising: a maneuverability modelling circuit configured to determine a maximum acceleration capability of the projectile; a radar receiver configured to estimate a range from the projectile to a target; a guidance law calculation circuit configured to calculate a first flight path to provide an offset radar viewing angle to the target that is offset from a longitudinal axis of the projectile, and to calculate a second flight path to provide for interception of the target by the projectile, the calculations based on the maximum acceleration capability and the range from the projectile to the target; and a navigation system configured to guide the projectile based on the first flight path and the second flight path.

In some cases, the system further comprises an aerodynamic modelling circuit configured to calculate aerodynamic forces and moments on the projectile, the calculation based on aerodynamic coefficients of the projectile and on flight data. In some such cases, the flight data includes one or more of projectile velocity, projectile attitude, air density, and control surface positions of the projectile. In some such cases, the maneuverability modelling circuit calculates acceleration of the projectile, based on the aerodynamic forces and moments, and determines the maximum acceleration capability of the projectile based on the calculated acceleration. In some cases, the system further comprises a navigation system configured to guide the projectile on the first flight path for an initial time period and then guide the projectile on the second flight path until target interception. In some cases, the offset radar viewing angle is based on a radar angular resolution requirement. In some cases, the offset radar viewing angle is in the range of four to six degrees.

Another example embodiment of the present disclosure provides a computer program product including one or more machine-readable mediums encoded with instructions that when executed by one or more processors cause a process to be carried out for off-axis projectile guidance, the process comprising: determining a maximum acceleration capability of the projectile; estimating a range from the projectile to a target; calculating a first flight path to provide an offset radar viewing angle to the target that is offset from a longitudinal axis of the projectile and calculating a second flight path to provide for interception of the target by the projectile, the calculations based on the maximum acceleration capability and the range from the projectile to the target; and guiding the projectile based on the first flight path and the second flight path.

In some cases, the process further comprises calculating aerodynamic forces and moments on the projectile, the calculation based on aerodynamic coefficients of the projectile and on flight data. In some such cases, the flight data includes one or more of projectile velocity, projectile attitude, air density, and control surface positions of the projectile. In some such cases, the process further comprises calculating acceleration of the projectile, based on the aerodynamic forces and moments, and determining the maximum acceleration capability of the projectile based on the calculated acceleration. In some cases, the process further comprises guiding the projectile on the first flight path for an initial time period and then guiding the projectile on the second flight path until target interception. In some cases, the offset radar viewing angle is based on a radar angular resolution requirement. In some cases, the offset radar viewing angle is in the range of four to six degrees.

Another example embodiment of the present disclosure provides a method for providing off-axis projectile guidance, the method comprising: determining, by a processor-based system, a maximum acceleration capability of the projectile; estimating, by the processor-based system, a range from the projectile to a target; calculating, by the processor-based system, a first flight path to provide an offset radar viewing angle to the target that is offset from a longitudinal axis of the projectile and calculating a second flight path to provide for interception of the target by the projectile, the calculations based on the maximum acceleration capability and the range from the projectile to the target; and guiding, by the processor-based system, the projectile on the first flight path for an initial time period and then guiding the projectile on the second flight path until target interception.

In some cases, the method comprises calculating aerodynamic forces and moments on the projectile, the calculation based on aerodynamic coefficients of the projectile and on flight data. In some such cases, the flight data includes one or more of projectile velocity, projectile attitude, air density, and control surface positions of the projectile. In some such cases, the process comprises calculating acceleration of the projectile, based on the aerodynamic forces and moments, and determining the maximum acceleration capability of the projectile based on the calculated acceleration. In some cases, the offset radar viewing angle is based on a radar angular resolution requirement. In some cases, the offset radar viewing angle is in the range of four to six degrees.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A projectile guidance system comprising:
   a maneuverability modelling circuit configured to determine a maximum acceleration capability of the projectile;
   a radar receiver configured to estimate a range from the projectile to a target;
   a guidance law calculation circuit configured to calculate a first flight path to provide an offset radar viewing angle to the target that is offset from a longitudinal axis of the projectile, and to calculate a second flight path to provide for interception of the target by the projectile, the calculations based on the maximum acceleration capability and the range from the projectile to the target; and
   a navigation system configured to guide the projectile based on the first flight path and the second flight path.

2. The system of claim 1, further comprising an aerodynamic modelling circuit configured to calculate aerodynamic forces and moments on the projectile, the calculation based on aerodynamic coefficients of the projectile and on flight data.

3. The system of claim 2, wherein the flight data includes one or more of projectile velocity, projectile attitude, air density, and control surface positions of the projectile.

4. The system of claim 2, wherein the maneuverability modelling circuit calculates acceleration of the projectile, based on the aerodynamic forces and moments, and determines the maximum acceleration capability of the projectile based on the calculated acceleration.

5. The system of claim 1, further comprising a navigation system configured to guide the projectile on the first flight path for an initial time period and then guide the projectile on the second flight path until target interception.

6. The system of claim 1, wherein the offset radar viewing angle is based on a radar angular resolution requirement.

7. The system of claim 1, wherein the offset radar viewing angle is in the range of four to six degrees.

8. A computer program product including one or more machine-readable mediums encoded with instructions that when executed by one or more processors cause a process to be carried out for off-axis projectile guidance, the process comprising:
   Determining a maximum acceleration capability of the projectile;
   estimating a range from the projectile to a target;
   calculating a first flight path to provide an offset radar viewing angle to the target that is offset from a longitudinal axis of the projectile and calculating a second flight path to provide for interception of the target by the projectile, the calculations based on the maximum acceleration capability and the range from the projectile to the target; and
   guiding the projectile based on the first flight path and the second flight path.

9. The computer program product of claim 8, wherein the process comprises calculating aerodynamic forces and moments on the projectile, the calculation based on aerodynamic coefficients of the projectile and on flight data.

10. The computer program product of claim 9, wherein the flight data includes one or more of projectile velocity, projectile attitude, air density, and control surface positions of the projectile.

11. The computer program product of claim 9, wherein the process comprises calculating acceleration of the projectile, based on the aerodynamic forces and moments, and determining the maximum acceleration capability of the projectile based on the calculated acceleration.

12. The computer program product of claim 8, wherein the process comprises guiding the projectile on the first flight path for an initial time period and then guiding the projectile on the second flight path until target interception.

13. The computer program product of claim 8, wherein the offset radar viewing angle is based on a radar angular resolution requirement.

14. The computer program product of claim 8, wherein the offset radar viewing angle is in the range of four to six degrees.

15. A method for providing off-axis projectile guidance, the method comprising:
   determining, by a processor-based system, a maximum acceleration capability of the projectile;
   estimating, by the processor-based system, a range from the projectile to a target;
   calculating, by the processor-based system, a first flight path to provide an offset radar viewing angle to the target that is offset from a longitudinal axis of the projectile and calculating a second flight path to provide for interception of the target by the projectile, the calculations based on the maximum acceleration capability and the range from the projectile to the target; and guiding, by the processor-based system, the projectile on the first flight path for an initial time period and then guiding the projectile on the second flight path until target interception.

16. The method of claim 15, comprising calculating aerodynamic forces and moments on the projectile, the calculation based on aerodynamic coefficients of the projectile and on flight data.

17. The method of claim 16, wherein the flight data includes one or more of projectile velocity, projectile attitude, air density, and control surface positions of the projectile.

18. The method of claim 16, comprising calculating acceleration of the projectile, based on the aerodynamic forces and moments, and determining the maximum acceleration capability of the projectile based on the calculated acceleration.

19. The method of claim 15, wherein the offset radar viewing angle is based on a radar angular resolution requirement.

20. The method of claim 15, wherein the offset radar viewing angle is in the range of four to six degrees.

* * * * *